Figure 1:
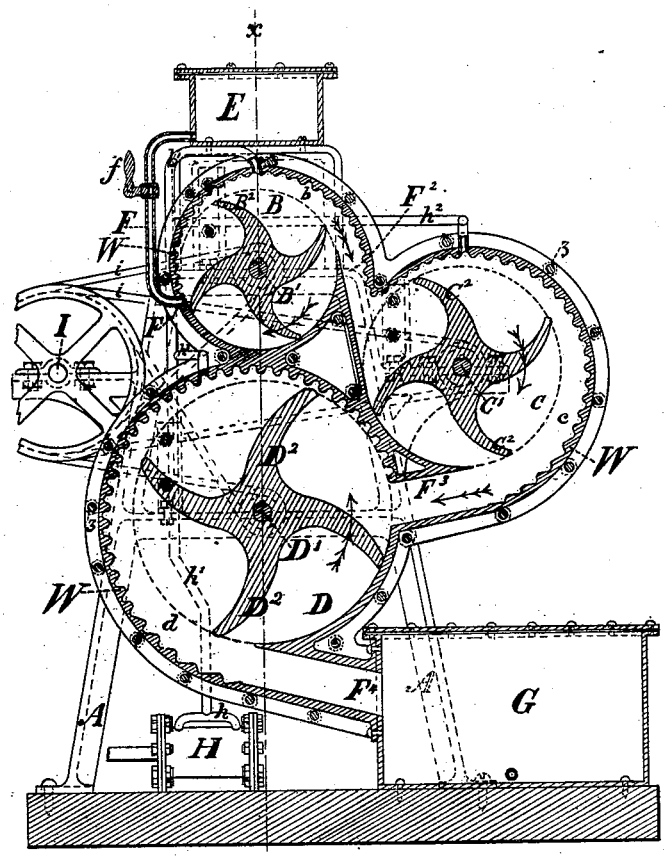

(No Model.)

C. W. RAMSAY.
Process of Treating and Aging Liquors.

No. 243,157.            Patented June 21, 1881.

Witnesses.

Inventor.
Charles W. Ramsay
By his attorney
M. Randolph

UNITED STATES PATENT OFFICE.

CHARLES W. RAMSAY, OF BROOKLYN, NEW YORK.

PROCESS OF TREATING AND AGING LIQUORS.

SPECIFICATION forming part of Letters Patent No. 243,157, dated June 21, 1881.

Application filed September 13, 1880. (No model.)

*To all whom it may concern:*

Be it known that I, CHARLES W. RAMSAY, of the city of Brooklyn, in the county of Kings and State of New York, have invented an Improved Process of Oxidizing or Aging Whisky, Brandy, Gin, and Distilled and Fermented Liquids; and I hereby declare the following to be a full and clear description thereof.

The ordinary method of oxidizing or aging liquors is, as is well known, to simply allow them to stand in casks a sufficient length of time to effect the desired result, and this operation has sometimes been accelerated by placing the casks, with their contents, on shipboard, and during a trip at sea the constant agitation of the casks not only breaks up the oil-globules supposed to exist in the liquid, but also exposes them to contact with any oxygen or atmospheric air contained in the casks, and the liquid thus becomes oxidized or aged; but it is evident that both this accelerating operation and the ordinary method of aging are quite expensive, the latter by reason of the large annual interest on the investment, and the former by reason of the added cost of handling, transportation, and wastage. To overcome these difficulties various devices and expedients have been employed. Some of these have been chemical and highly injurious, often poisonous, to the liquids treated, and others have been mechanical; but none so far have been efficient and at the same time beneficial. One of the mechanical means employed has been to force atmospheric air or oxygen through the liquid to be treated while the latter was in a compact mass, or in thin sheets, or in small streams; but none of such devices have contemplated driving the material into such an attenuated form as to reduce it to the atomic state, and consequently such experiments have been attended with no valuable results.

The fusel-oil contained in distilled liquids is generally believed to be in small oil-sacks which are distributed throughout the mass; and in order to thoroughly oxidize or age the liquid these sacks must be broken up and the contained fusel-oil disseminated throughout the mass. In this state the oil will decompose into a number of volatile ethers, some of which will escape by vaporization, and others, combined with oxygen, will emit a fragant perfume or aroma; and in order to produce this result the oil-sacks must be broken up and the whole mass thoroughly brought into contact with oxygen, either in the form of atmospheric air or pure oxygen.

My invention consists in the process of treating whisky, brandy, gin, &c., and distilled and fermented liquids, by first vaporizing or atomizing such liquids, and then subjecting them, while in the vaporous or atomic state, to violent shocks or concussions, and finally, while still in this vaporous or atomic state, introducing oxygen, either in a pure state or in the form of a mixture, such as atmospheric air, so as to permeate the mass and thoroughly oxidize it.

I do not in this specification limit myself to any particular machine or apparatus for carrying out my invention, but will describe a form of apparatus which I have employed with success. This apparatus is illustrated in the accompanying drawings, of which—

Figure 2:
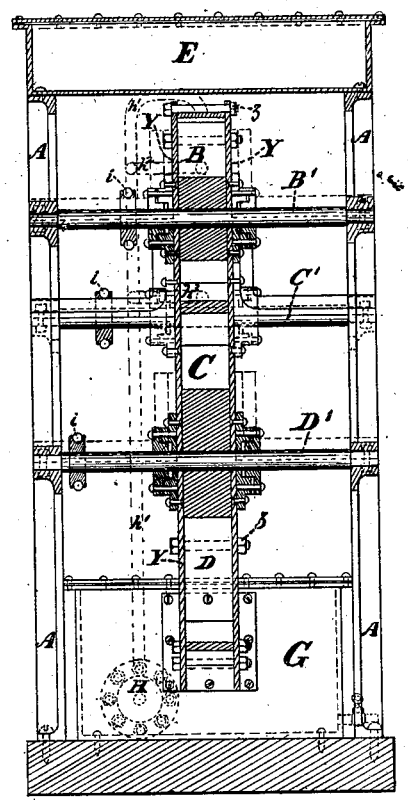

Figure 1 is a sectional elevation of the entire machine, showing the construction of each of the treating-chambers, also the tank from which the fluid is fed to the machine, and also the tank into which the vapor is discharged and where it recondenses. Fig. 2 is a sectional elevation of the machine, taken on the line $xx$ of Fig. 1.

The machine illustrated in the accompanying drawings and described in the subjoined specification is the subject of an accompanying application for patent by myself, and is only introduced in this application for the purpose of illustrating my method of carrying this process into operation.

In this machine A A represent a supporting-frame, which may be made in any desired or convenient form. Conveniently attached to and supported by this frame is a set of converting or treating chambers, B C D. There should preferably be two or more of these chambers, but for ordinary use I prefer to employ three of them, as I have shown. These chambers have helical or nearly helical sides W, as shown in Fig. 1, and straight parallel ends $y$, as shown in Fig. 2, the ends being tightly fitted to the side or curved plates, so as to form perfectly tight connections between these parts, which are to be secured together, either by stud-bolts securing each end respectively to the curved side plates, or by through-bolts $z$ passing through both of the end plates and holding them firmly together and to the intervening side plate, as shown in Fig. 2. There are driving-shafts $B'$ $C'$ $D'$ passing transversely through their respective chambers B C D, and provided with suitable bearings in the frame A A. To these shafts are respectively attached the rotary drivers or beaters $B^2$ $C^2$ $D^2$, the construction and operation of which will be presently explained.

The shafts $B'$ $C'$ $D'$ are placed eccentrically across the chambers B C D, to which they respectively belong, as is clearly shown in Fig. 1, so as to bring the sides of the rotary drivers or beaters (in each case) nearest the inlet-side of its chamber, thus allowing an increased amount of room on the opposite or outlet side of each set of drivers or beaters for the accommodation of the increased and increasing volume of the article under treatment as it assumes the attenuated or gaseous or vaporous form. This increase of the vaporous or gaseous cavity from the induction toward the eduction ports of the various chambers of this apparatus is clearly shown in Fig. 1, and the said cavities or sub-chambers are represented in the said Fig. 1 by the supplementary letters $b$ $c$ $d$, wherein it is not only shown that each of these vapor-cavities increases in size from the inlet end toward the outlet end, but also the second cavity or sub-chamber, $c$, is larger than the one, $b$, and the next one, $d$, is larger than the one, $c$, which precedes it. This arrangement will be found advantageous to adhere to in the construction of the apparatus, whether two or more of the converting-chambers are employed. This increase of size will preferably apply to the construction of the apparatus—i. e., increasing dimensions of the vaporous or gaseous cavities or sub-chambers should exist in the apparatus to allow for the expansion of the material under treatment—and this increase of size will belong to each separate cavity or sub-chamber, and also to the sectional area of the whole set of chambers taken as a whole.

The interior side of the curved plate W of each of the chambers B C D, from a point contiguous to the inlet or induction port to a point contiguous to the outlet or eduction port, (measured in the direction of the rotation of the drivers or beaters,) will be corrugated, the said corrugations being represented by the letters $w$ in Fig. 1.

The drivers or beaters $B^2$ $C^2$ $D^2$ preferably consist of two or more curved arms attached to or cast solidly with the hub-piece belonging thereto, each of the said hubs to be neatly fitted on and secured to the shaft to which it belongs, as shown in Fig. 1. Some effect, though not to so advantageous an extent, may be produced if these arms are straight, but I prefer the mode of construction described. The curvature of the arms of these drivers or beaters should be opposite the direction of their rotation. Of course it would be possible to use straight radial arms for this purpose, but they would be liable to gather a considerable amount of the fluid between them during their rotation, and so render ineffective, to a considerable degree, the centrifugal action of the machine. With the curved arms shown in the drawings the centrifugal action of the machine will be positive and certain; but if the arms were straight, the effect might be to clog the machine.

An important element in the construction and operation of this apparatus is the construction and location of the ports or apertures through and from which the article treated is to be passed into and out of the converting or treating chambers. The material to be treated should be placed in a suitable tank or reservoir, E, which will, for most or all purposes, require to be tightly closed, except at its outlet, pipe F, through which the fluid to be treated will pass into the converting-chamber. The pipe F should be provided with a suitable stop-cock, $f$, to prevent or regulate the flow of the fluid into the apparatus, and this pipe will discharge itself through an aperture, $F'$, into the first chamber, $B'$, and an aperture or duct, $F^2$, connects the chamber C with the chamber D, and so on, should there be more than three of the converting-chambers, while the last duct or aperture, $F^4$, will lead from the last chamber of the series to the receiver or storage-reservoir G, where the vapor will be allowed to recondense into the form of fluid. As is clearly shown in Fig. 1, the inlet or duct F is placed as nearly as practicable toward the bottom or lowest point of the first converting-chamber, B, and the aperture or duct $F^2$, leading from the first to the second chamber of the series, is placed tangentially to the first converting-chamber, or as nearly so as practicable, and as far removed circumferentially from the inlet-duct $F'$ as the combination of the different cylinders will allow. This is for the purpose of utilizing as much of the corrugated surface $w$ as possible, and this arrangement of the inlet and outlet ducts must apply as far as possible to each converting-chamber of the set, the important point being that each inlet shall be as near the bottom of its chamber as practicable, and each outlet placed tangentially, or nearly so, to its respective chamber, and as far removed circumferentially from its corresponding inlet as possible, so as to get the full benefit of the operating-surface $w$.

The first inlet or duct, $F'$, being only required for the passage of fluid, need only be of the size of the pipe to which it is attached; but the duct $F^2$, being for the passage of vaporized or partly-vaporized material, will necessarily be larger than $F'$, and the duct $F^3$, being for the passage of the same amount of material as $F^2$, but in a more rarefied form, must be larger than the duct $F^2$, and so on, and for the same reason duct $F^4$ must be larger than duct $F^3$.

Suitable stop-cocks may be attached to each of the cylinders or chambers, to draw off any sedimentary deposit that may accumulate in them.

This apparatus must necessarily be very strongly constructed, and for most purposes will be best built of cast-iron, and be copper or porcelain lined.

At this stage, if desired, oxygen in the form of atmospheric air or pure oxygen may be introduced into the chambers by means of a force-pump, air-compressor, or other suitable device, and this oxygen thus caused to thoroughly permeate the contents of the chambers, whereby the aging of the liquor or other article treated will be easily and rapidly effected; and for this purpose an air-compressor or blower, H, should be suitably placed and connected with each of the converting-chambers by branch pipes $h$ $h'$ $h^2$ $h^3$, and this air-compressor may be used to drive atmospheric air or oxygen into the converting-chambers during the process of treating any fluid which will require such auxiliary treatment while it is in a vaporous form for the purpose of aging or oxidizing.

The method of operating my apparatus is very simply explained. The substance or fluid to be treated is fed into the first or converting chamber through the pipe F, and is driven around by the drivers or beaters $B^2$ against the smooth or corrugated surface of the chamber B, the material flying off from the rotary arms or beaters of $B^2$ in centrifugal lines with great force, and striking the corrugations $w$ with such a violent impact as to destroy in the first chamber most of the infusorial or other germ life, and in the successive chamber or chambers all of the germ-life contained in the article treated. In each successive chamber after the first the rarefication of the material will be increased and the shocks imparted will be more severe until the final climax is reached in the last converting-chamber. This effect will be aided by reason of the gradually-increasing dimensions of the treating-chambers hereinbefore explained, and by the rotating of each successive set of drivers or beaters after the first more rapidly than the one preceding it. Thus about the proper speed for the first driver or beater $B^2$ should be, say, fifteen hundred revolutions per minute; that for the driver or beater $C^2$ should be about two thousand revolutions per minute, and that for the driver or beater $D^2$ should be about twenty-five hundred revolutions per minute, and so on. This is, of course, only intended as a general guide as to the regulation of the proper speed of the respective drivers or beaters, and it may, in either case, be made more or less, as may be desired or best adapted to any particular work.

The drivers or beaters should preferably be rotated from a common driving-shaft, I, by means of suitable belts, $i$, or by corresponding cog-gearing; but the mechanism should be so constructed as to rotate the drivers or beaters against the current of the fluid fed to them respectively, as indicated by the arrows in Fig. 1. The object of this construction is to cause the drivers or beaters to move in against the current of fluid or vapor fed to them, which will thereby impinge with great violence upon the drivers or beaters, thus very greatly contributing to the production of the general result.

It is important that the apertures or ducts $F'$ $F^2$ $F^3$ should be located at as low a point as practicable in the chambers they are respectively intended to exhaust, and that the direction of their discharge shall be downwardly, as I have found it to be impracticable to discharge these cold vapors in any other direction than downwardly.

I am well aware of the existing patents of R. D. Turner, numbered 96,056 and 136,470, dated, respectively, October 19, 1869, and March 4, 1873; but as those patents only contemplate oxidizing or aging liquor while in the form of fine spray or small streams, without any appliance for breaking up the globular formation of the fluid into an atomic form by means of concussion or otherwise, they do not anticipate the chief feature of my process, as herein described, and consequently do not relate to my process.

I am also aware that it is not new to spray liquors for the purpose of aging them upon rotary beaters in adjoining chambers, as shown in Patent No. 122,513, issued to S. C. Bruce January 9, 1872.

Having described my invention, I claim—

The process of oxidizing or aging whisky, brandy, gin, and also distilled and fermented liquids, by first vaporizing the said liquids into a fine spray or attenuated atomic form, then while in this form submitting the vapors to shocks or concussions, and finally, while still in the vaporous state, impregnating them with atmospheric air or pure oxygen, substantially as and for the purpose set forth.

CHARLES W. RAMSAY.

Witnesses:
M. RANDOLPH,
C. B. HOTCHKISS.